US010278025B1

(12) United States Patent
Levin et al.

(10) Patent No.: US 10,278,025 B1
(45) Date of Patent: Apr. 30, 2019

(54) DEVICE CLUSTERING FOR ENHANCED LOCATION SERVICES

(71) Applicant: Intel IP Corporation, Santa Clara, CA (US)

(72) Inventors: Tirosh Levin, Hadera (IL); Chandru Aswani, Bangalore (IN); Shidlingeshwar Khatakalle, Maharashtra (IN); Stefan Meyer, Hoechstadt (DE); Haim Rochberger, Tel Mond (IL)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/937,616

(22) Filed: Mar. 27, 2018

(51) Int. Cl.
  *H04W 4/02* (2018.01)
  *H04W 4/80* (2018.01)
  *H04W 52/02* (2009.01)
  *H04W 84/20* (2009.01)

(52) U.S. Cl.
  CPC .......... *H04W 4/025* (2013.01); *H04W 4/80* (2018.02); *H04W 52/0264* (2013.01); *H04W 84/20* (2013.01)

(58) Field of Classification Search
  CPC .. H04W 4/025; H04W 52/0229; H04W 84/12
  See application file for complete search history.

(56) References Cited

U.S. PATENT DOCUMENTS

2008/0279155 A1* 11/2008 Pratt, Jr. ............... H04L 12/66
  370/336
2017/0156113 A1*  6/2017 Visuri .................. H04W 48/16

OTHER PUBLICATIONS

"Global Navigation Satellite System Profile", Bluetooth Special Interest Group (SIG), Mar. 14, 2012, 17 pages (accessed at https://www.bluetooth.org/docman/handlers/downloaddoc.ashx?doc_id=247374 on Mar. 27, 2018).
"Standard NMEA-0183 sentences description", FreeNMEA.net, 6 pages (accessed at http://freenmea.net/docs on Jun. 27, 2018).

* cited by examiner

*Primary Examiner* — Diane D Mizrahi
(74) *Attorney, Agent, or Firm* — Alliance IP, LLC

(57) ABSTRACT

The apparatus of a first wireless communication device includes memory comprising instructions and processing circuitry coupled to the memory. The processing circuitry is to implement the instructions to establish a wireless connection between the first wireless communication device and a second wireless communication device according to a wireless connectivity protocol, establish, using the wireless connectivity protocol, a location profile communication cluster including the first device and the second device, and within the communication cluster: process a message from the second device including location information and determine a provision of location services for the cluster based on the location information.

25 Claims, 8 Drawing Sheets

DEVICE CLUSTERING FOR ENHANCED LOCATION SERVICES

TECHNICAL FIELD

The instant disclosure generally relates to the provision of location information as between a plurality of devices using wireless communication networks.

BACKGROUND

Many personal devices, such as mobile phones, wearables, etc., are equipped with location service capabilities (e.g., global navigation satellite system (GNSS) capabilities). Other devices, such as automobile or standalone navigation devices, are equipped with these capabilities as well. In many cases, a device may use its location service capabilities to provide a location of the device to one or more applications installed on the device. For example, a device may provide, via its GNSS capabilities, position information used in a navigation application. Current techniques, however, do not allow for enhanced location service information sharing between devices, such as between devices that are clustered according to a wireless connectivity protocol (e.g., Bluetooth).

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
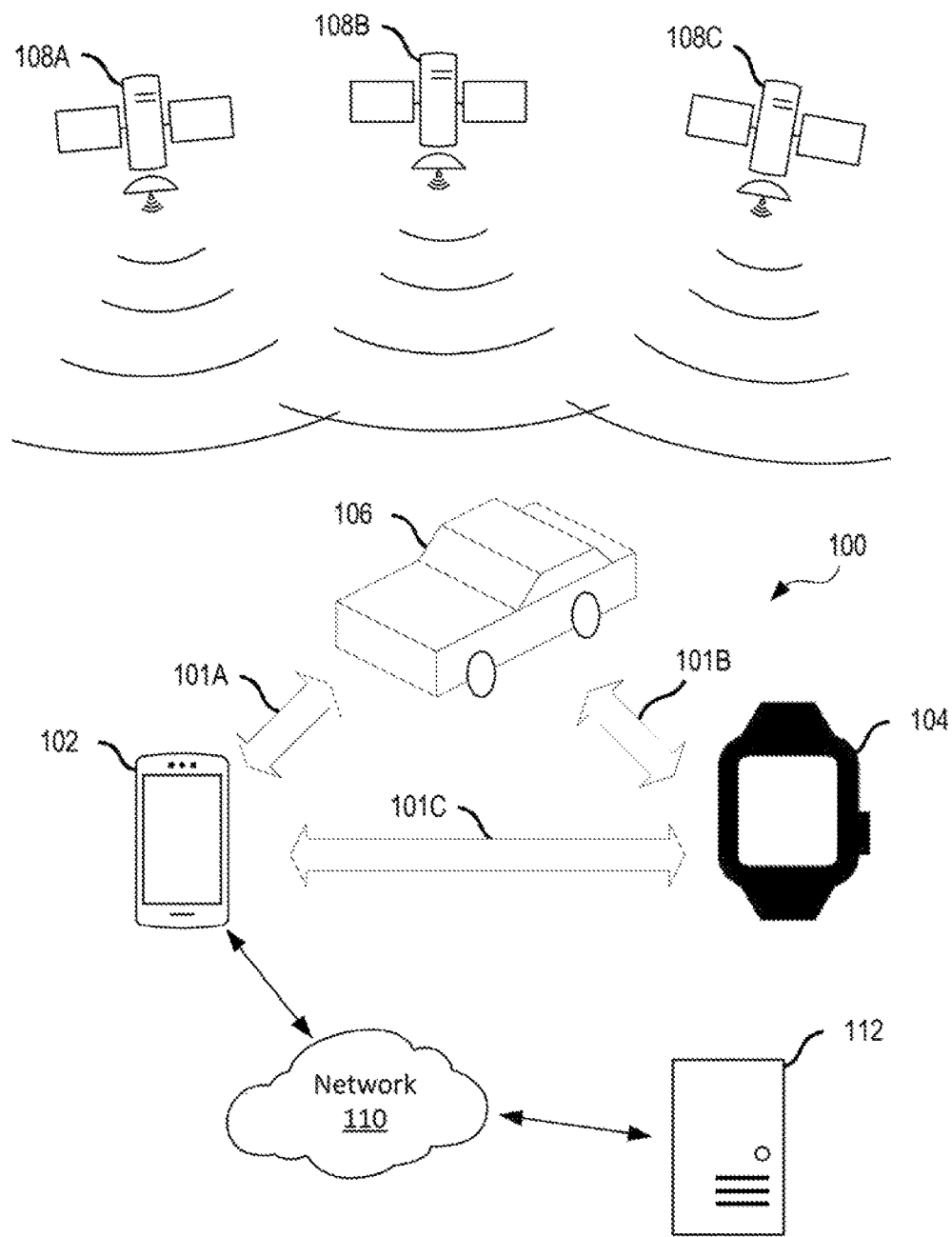
FIG. 1 is a diagram of an example environment for providing location services according to one embodiment.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

For simplicity and clarity of illustration, the drawing figures illustrate the general manner of construction, and descriptions and details of well-known features and techniques may be omitted to avoid unnecessarily obscuring the discussion of the described embodiments. Additionally, elements in the drawing figures are not necessarily drawn to scale. For example, the dimensions of some of the elements in the figures may be exaggerated relative to other elements to help improve understanding of the disclosed embodiments. The same reference numerals in different figures denote the same elements, while similar reference numerals may, but do not necessarily, denote similar elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of actions, the order of such actions as presented herein is not necessarily the only order in which such actions may be performed, and certain of the stated actions may possibly be omitted and/or certain other actions not described herein may possibly be added to the method. Furthermore, the terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein. The term "coupled," as used herein, is defined as directly or indirectly connected in an electrical or non-electrical manner. Objects described herein as being "adjacent to" each other may be in physical contact with each other, in close proximity to each other, or in the same general region or area as each other, as appropriate for the context in which the phrase is used. Occurrences of the phrase "in one embodiment" herein do not necessarily all refer to the same embodiment.

FIG. 1 is a diagram of an example environment for providing location services according to one embodiment. The environment includes a network 100, such as, for example, a personal area network (PAN), which includes devices 102, 104, 106 connected to one another over direct connections 101. For example, the PAN 100 and the connections between the devices 102, 104, 106 may be based on a wireless connectivity protocol, such as, for example, the Bluetooth protocol. In the example shown, the device 102 is a smartphone, the device 104 is a wearable, such as a smart watch, and the device 106 is an automobile navigation system (which may be standalone or integrated with the automobile). In the example shown, each of the devices 102, 104, 106 is capable of providing location services based on GNSS data from satellites 108. For example, each of the devices 102, 104, 106 may include a GNSS hardware component that allows the device to receive and process information from a GNSS constellation of satellites. The devices may then use the information from the satellites 108 to determine a current location of the device (sometimes referred to as a "fix"), or provide other location services.

In addition, in the example shown, the device 102 also has assisted GNSS (A-GNSS) capabilities and the server 112 may be capable of providing A-GNSS data to the device 102 based on information received at the server 112 from the satellites 108. That is, the device 102 may connect to the server 112 over the network 110 to obtain position information already determined by the server 112 based on information from the satellites 108. The server 112, like device 102, 104, 106 may include a GNSS hardware component for receiving and processing information from the satellites 108 to determine position information. The server 112 may provide the position information (e.g., assisted GNSS (A-GNSS) data) to any of the devices in network 100 that are connected to the network 110.

Using current techniques, the devices 102, 104, 106 might not be able to provide their full location information to one another, such as to make a collaborative decision as to which device should be using or obtaining GNSS data at a time. The following examples are illustrative: (1) Suppose that a user is leaving his office and looking for a navigation route to a restaurant by smartphone device 102. The user later enters his car and uses the navigation device 106 to drive to the restaurant. In this example, the GNSS component of the smartphone device 102 may be active throughout the entire drive and thus, may consume power while not being used. In addition, it may take some time for the navigation device 106 to get a first position fix on its location, even though the car's position is already known to the smartphone device 102. (2) Suppose a user is using a fitness application in his smart watch device 104, when the battery of the smart watch device 104 hits a critical level (e.g., 20% remaining). The user may decide to activate the location services in his smartphone device 102 to avoid draining the battery completely. However, it may take the smartphone device 102 some time to get a first fix on its location, even though the position is already known to the smart watch device 104. (3) Suppose a user is using his smart watch device 104 for positioning, and it takes the smart watch device 104 some time to get a first fix on its location. However, the user's phone device 102 may have A-GNSS data (e.g., from server 112) which could be shared with the smart watch device 104 and used to shorten the time to obtaining a first fix on its location. Each of these examples illustrate the unnecessary loss of performance and power consumption that could be avoided if the devices were able to communicate and operate in a collaborative manner with respect to their GNSS capabilities.

Thus, in certain aspects, the devices of the network 100 may establish a location profile communication cluster with one using the connections 101 of the network 100 in order to share location service information or location service capabilities with the other devices of the network 100. The location profile communication cluster may be established according to one or more profiles of the wireless connectivity protocol used to create the connections 101 of the network 100. For example, in some cases, the location profile communication cluster is based on a GNSS or other location services profile of the Bluetooth connectivity protocol. The location profile communication cluster may allow the devices to collaborate with one another to more optimally utilize their location service capabilities. For example, a selected device in the cluster may receive location information, device capability information, device status information, or other information from the other devices, and determine a provision of location services to one or more of the cluster devices based on the information received.

For example, in some embodiments, the devices may share their location service capabilities or other information with a device designated as a "manager" for the cluster, and the cluster manager may in turn determine the provision of location services among the other "client" cluster devices. For instance, in some embodiments, the manager device of the cluster may share location service information between devices, send control commands to the client devices related to the provision of the location services, or provide other location service data or commands to the client devices. As one example, the manager device may determine that a device in the cluster should hand off certain responsibilities related to positioning or navigation services being provided. As another example, the manager device may determine that a device should obtain position information (e.g., via A-GNSS data, native GNSS capabilities, or otherwise) and provide the position information to one or more other devices in the cluster, which may then use the position information to provide certain other location services (e.g., navigation). In certain embodiments, there may be only one manager device in the cluster. By establishing a location profile communication cluster in this manner, the devices of the cluster may advantageously provide a continuous location service experience while improving overall performance and reducing power consumption by the devices of the cluster.

Figure 2:
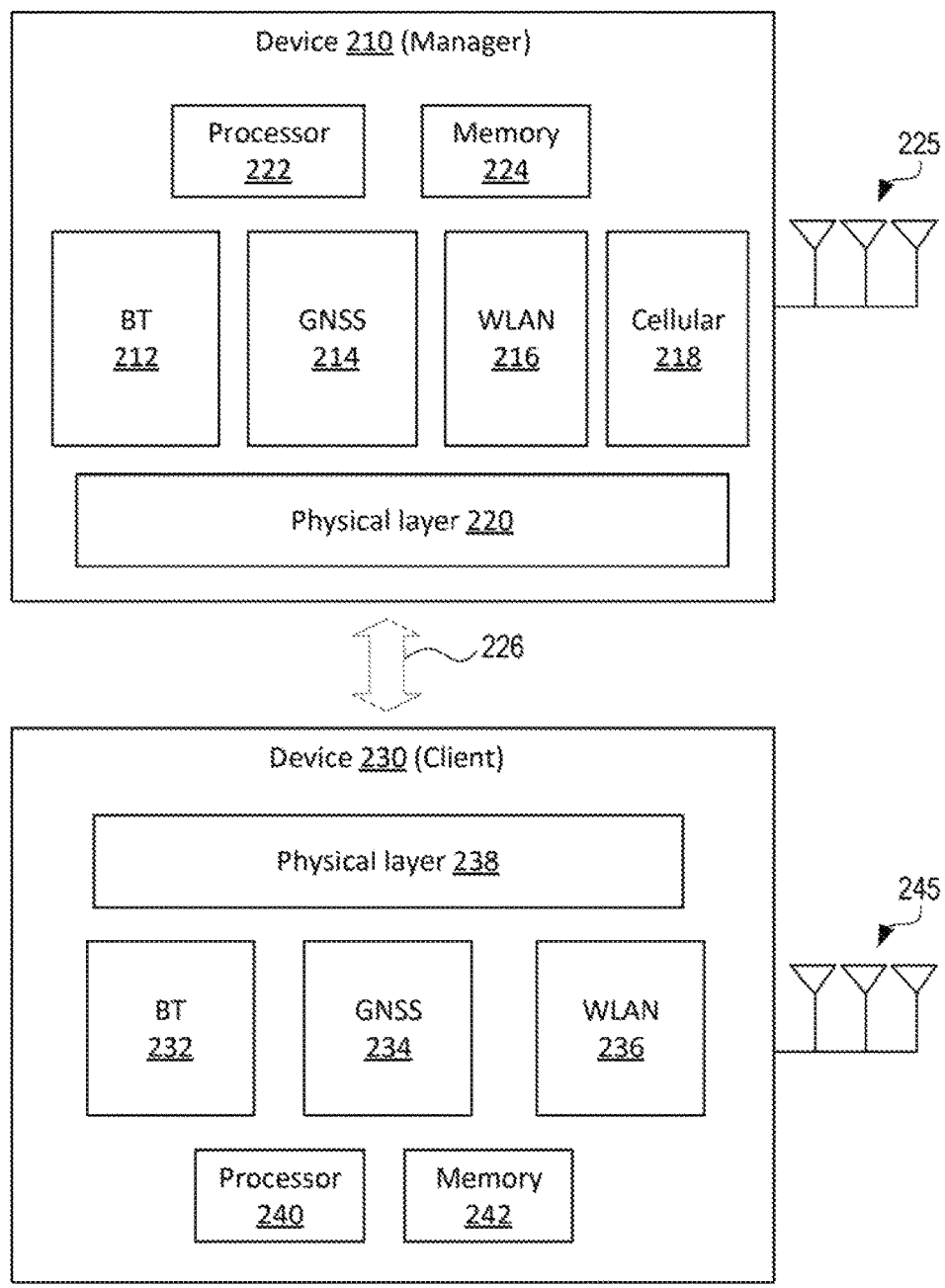
FIG. 2 is a simplified block diagram of example devices that may establish a location profile communication cluster according to one embodiment.

FIG. 2 is a simplified block diagram of example devices that may establish a location profile communication cluster according to one embodiment. The example devices include a first device 210 and second device 230, and in the example shown, the device 210 acts as a manager device of the cluster while the device 230 acts as a client device in the cluster. In some embodiments, the cluster of devices 210, 230 is established according to a wireless connectivity protocol or a profile thereof. For example, in some cases, the cluster may be established using a Bluetooth profile, such as a GNSS profile of the Bluetooth protocol. The devices 210, 230 may first establish a wireless connection 226 according to the connectivity protocol (e.g., Bluetooth) and then establish the location profile communication cluster, as described further below. In some instances, the devices 210, 230 may support a PXP, Proximity Profile for the Bluetooth protocol, which may allow the devices to find and connect to nearby devices in the cluster. In other instances, the devices 210, 230 may be manually connected to one another (e.g., via user interfaces on the respective devices). In some embodiments, the devices 210, 230 may support a mesh networking profile, such as the MESH, Mesh Profile for the Bluetooth protocol, for cluster networking management as a full-mesh network topology between the devices of the cluster.

The device 210 includes a processor 222 (e.g., a central processing unit (CPU), application processing unit (APU), or a combination thereof), memory 224 (e.g., random access memory (RAM), read only memory (ROM), or a combination thereof), Bluetooth circuitry 212 (e.g., Bluetooth circuitry including a Bluetooth baseband processor, radio integrated circuit, front end module and at least one antenna), GNSS circuitry 214, wireless local area network (WLAN) circuitry 216 (e.g., a WLAN circuit card or WLAN system including a WLAN baseband processor, radio integrated circuit, front end module and at least one antenna), cellular communication circuitry 218 (e.g., hardware components including a baseband processor, a radio integrated circuit, front end module, and at least one antenna for communication over a 3G, 4G, 5G, or another type of cellular communication network). The device 210 also includes physical layer (PHY) circuitry 220 for performing low-level signal processing for communication by one or more of the network connectivity mechanisms 212, 214, 216, 218. The PHY circuitry 220 may include one or more digital circuits, analog circuits, or other hardware for performing the low-level signal processing. The PHY circuitry 220 may provide the low-level signals to one or more of the antennas 225 of the device 210, for communication to device 230 or to another device.

The device 230 includes a processor 240, memory 242, Bluetooth circuitry 232, GNSS circuitry 234, WLAN circuitry 236, PHY circuitry 238, and antennas 245 which may each be configured in a similar manner to the counterpart network connectivity mechanisms of the device 210.

The Bluetooth circuitry 212, 232 may allow for direct communication between the devices 210, 230 over the wireless connection 226. The GNSS circuitry 214, 234 may allow for communication with positioning satellites that provide GNSS data to the devices for location services. The WLAN circuitry 216, 236 may allow for communication over a wireless local network, such as a Wi-Fi network. The cellular communication circuitry 218 may allow for communication over a cellular network, such as a 3G, 4G, or 5G network. The network connectivity mechanisms shown in FIG. 2 are not limited to Bluetooth, GNSS, WLAN, or cellular communication, and can include other connectivity mechanisms involving other wireless connectivity protocols as would be recognized by one skilled in the art. The devices 210, 230 may be any suitable type of device with the illustrated functionality, and may include a smartphone, tablet, wearable device, navigation system, or another type of device. For example, the device 210 may be a smartphone similar to the device 102 of FIG. 1, while the device 230 may be a wearable device similar to the device 104 of FIG. 1.

In the example shown, one or both of the processors 222, 240 of the devices 210, 230, respectively, have selected the device 210 to act as the manager device of the cluster. The processors may, in some instances, make this determination based on an assumption that the device 210 is a type of device that will typically be a part of any cluster, while the device 230 and other devices (e.g., wearables, car navigation systems, etc.) are types of devices that might only be part of the cluster at certain times. For example, in some cases, the processor of a smartphone in the cluster may choose itself to act as the manager device since it is assumed to be a part of the cluster in a majority of scenarios. For instance, while driving, a car navigation system will be clustered with the smartphone while a wearable device will not be part of the cluster. Likewise, during fitness activities (e.g., running), the wearable device will be clustered with the smartphone while the car navigation system is not. In some cases, one or both of the processors 222, 240 of the devices 210, 230, respectively may choose the device 210 as the manger device because it has certain resources or capabilities that other devices in the cluster do not have (e.g., MIPS, available memory, available battery, availability for software upgrades, A-GNSS capabilities, etc.).

Figure 3:
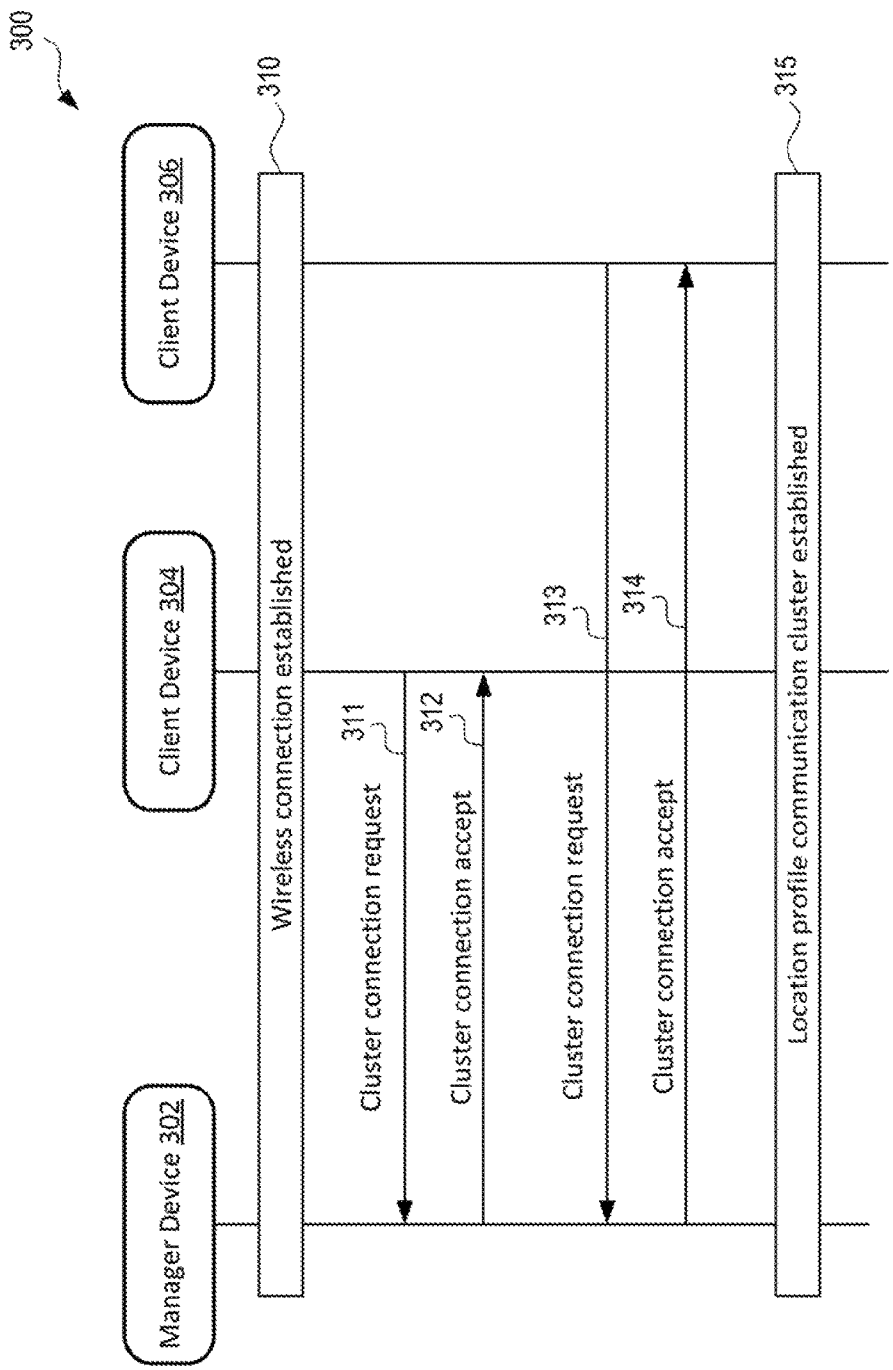
FIG. 3 is a diagram showing an example signaling sequence for establishing a location profile communication cluster according to one embodiment.

FIG. 3 is a diagram showing an example signaling sequence 300 for establishing a location profile communication cluster according to one embodiment. It will be understood that the example sequence shown is a simplified sequence, and modifications, additions, or omissions may be made without departing from the scope of the present disclosure. As shown in FIG. 3, the devices 302, 304, 306 may first establish a wireless connection with one another at 310. For example, the devices may establish a personal area network (PAN) using direct connections (e.g., as shown in the example of FIG. 1). In some embodiments, the devices may establish wireless connections with one another according to a Bluetooth protocol, or another standardized protocol. As shown in FIG. 3, a manager device 302 may act as a manager for the devices, while the devices 304, 306 may act as client devices in the cluster.

After forming the wireless connections between devices at 310, the manager device 302 receives cluster connection requests at 311, 313 from the devices 304, 306, respectively. In response, the manager device 302 sends cluster connection acceptance messages at 312, 314 to the client devices 304, 306, respectively, to establish the location profile communication cluster between the devices at 315. In some embodiments, the cluster connection requests 311, 313 are formatted based on a profile of the wireless communication protocol used to establish the wireless connection between the devices. For example, in some instances, the connection requests are formatted based on a GNSS Profile of the Bluetooth protocol (e.g., an enhanced Bluetooth GNSS Profile). By forming a cluster between the devices, location services for the cluster may be provisioned between devices in a more advantageous manner.

Figure 4:
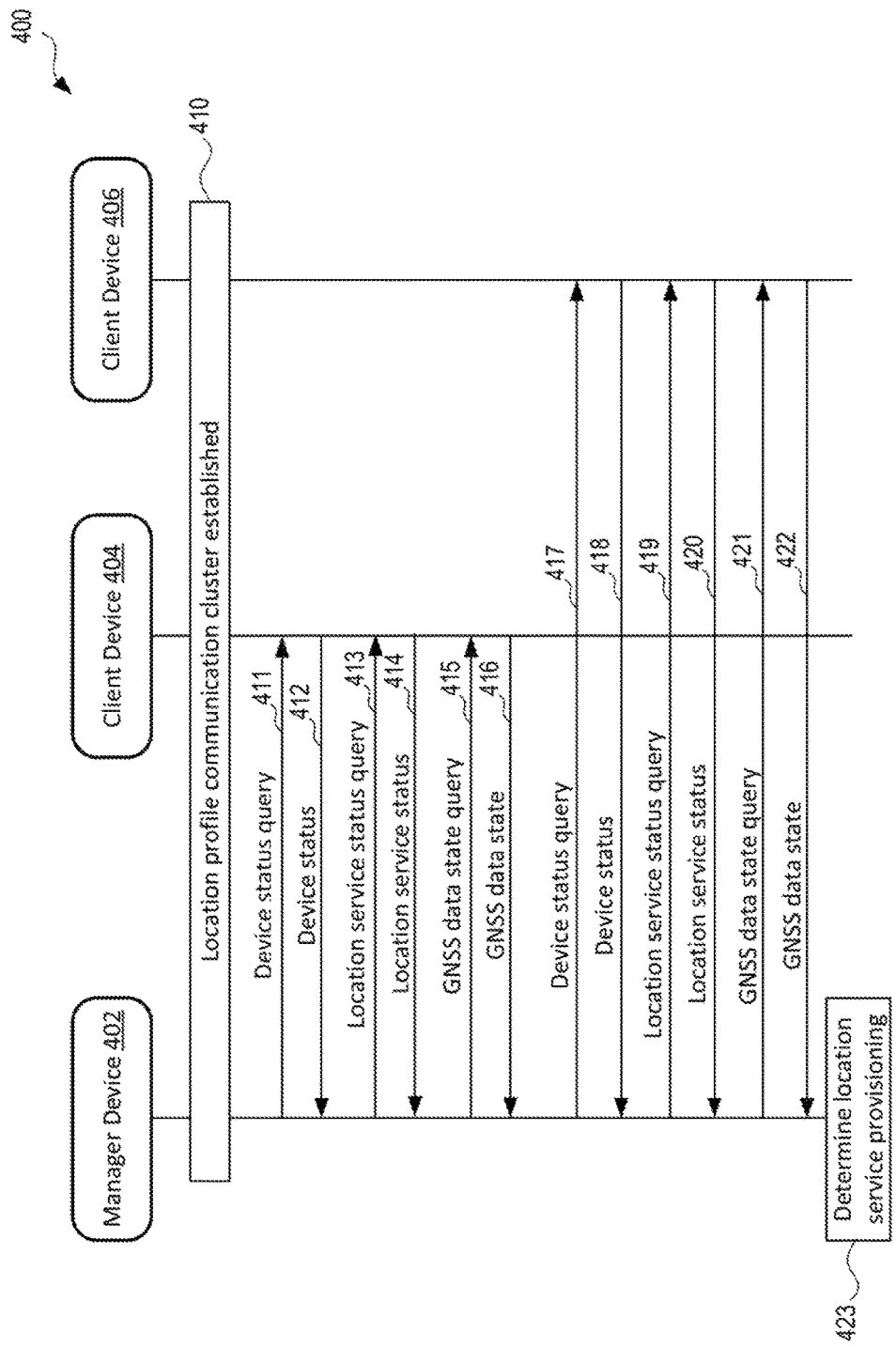
FIG. 4 is a diagram showing an example signaling sequence for sharing information between cluster devices according to one embodiment.

FIG. 4 is a diagram showing an example signaling sequence 400 for sharing information between cluster devices according to one embodiment. It will be understood that the example sequence shown is a simplified sequence, and modifications, additions, or omissions may be made without departing from the scope of the present disclosure. As shown in FIG. 4, the devices 402, 404, 406 may first establish a location profile communication cluster with one another at 410. In some instances, the location profile communication cluster may be established according to the sequence 300 shown in FIG. 3.

The manager device 402 may act as a manager of the cluster, and may accordingly query the client devices 404, 406 for certain information before determining a provision of location services for the cluster at 423. As shown in FIG. 4, the manager device 402 may send queries for device status information at 411, 417 (e.g., if they are GNSS capable, if they have outdoor/indoor positioning capabilities, and the accuracy they are capable to, their battery status (e.g. external power source/charging/battery above thresholds, e.g. 20%/battery below thresholds, e.g. 20%)), for ongoing location services status information for the devices at 413, 419 (e.g. whether the devices have ongoing fitness sessions, driving sessions, pedestrian sessions, etc., and for which application the services are being provided), and for a GNSS data state at 415, 421 (e.g., if the device has a fresh fix and the accuracy of it, or if it has any fresh assistance data (e.g., reference position, reference time, ephemeris, SV health, Ionospheric corrections, etc.)). In response, the client devices 404, 406 send messages to the manager device 402 containing their device status information at 412, 418, respectively, their location services status information at 414, 420, respectively, and the GNSS data state information at 416, 422, respectively. The manager device 402 may request additional information from the client devices 404, 406 in some cases. In some embodiments, the manager device 302 may, from time to time, request updates regarding any changes in the initially retrieved information from the client devices 304, 306.

In some embodiments, the cluster devices may format queries or messages to one another according to a National Marine Electronics Association (NMEA) protocol, and may use proprietary sentences to report certain data and information. For example, in some embodiments, certain messages exchanged between the devices 402, 404, 406 may be formatted as proprietary sentences according to NMEA 0183, Version 4.00 from November-2008, section 5.3.6, "Proprietary Sentences", or may be formatted as query sentences according to NMEA 0183, Version 4.00 from November-2008, section 5.3.5, "Query Sentences".

Figure 5:
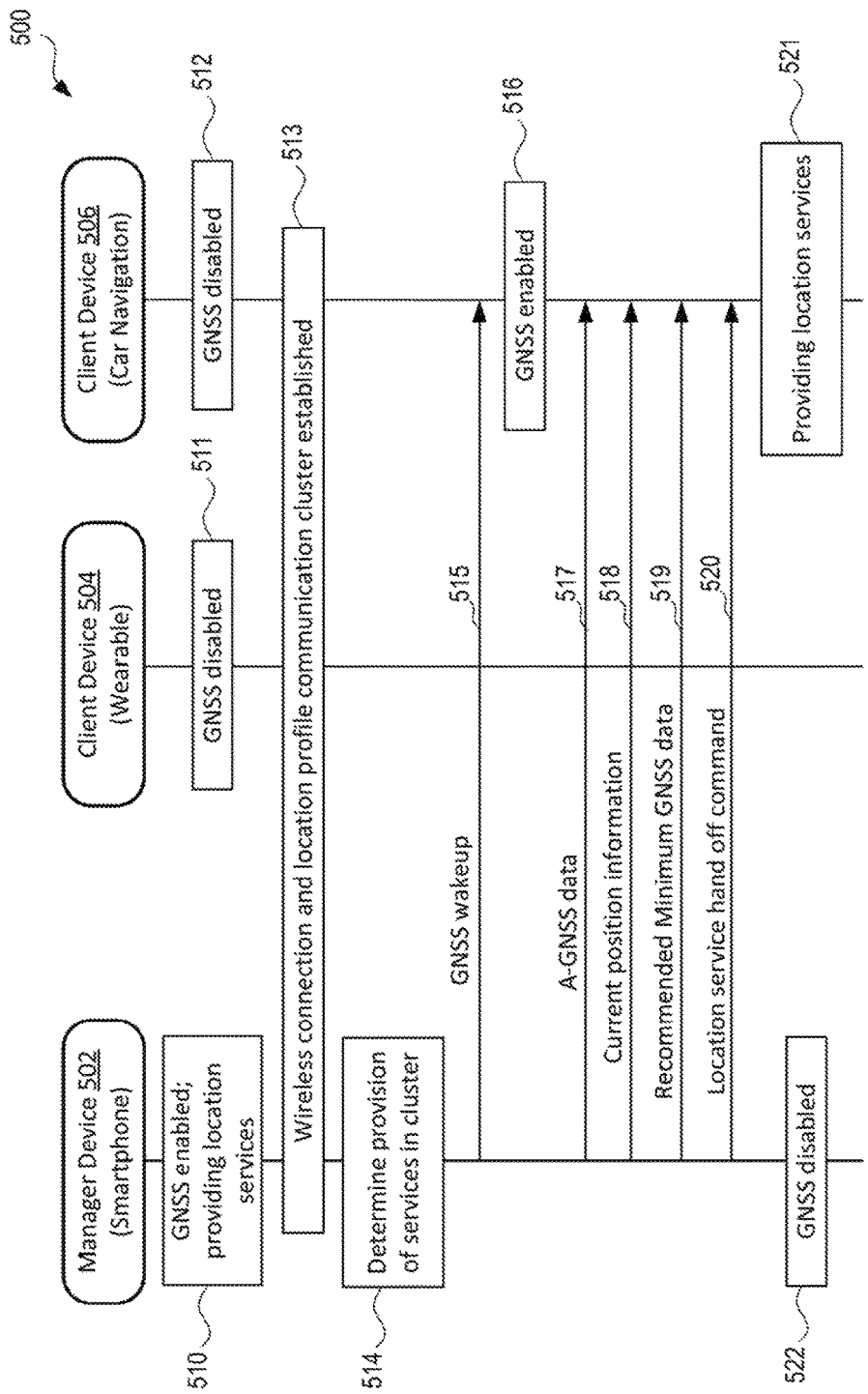
FIG. 5 is a diagram showing an example signaling sequence for handing off provision of location services according to one embodiment.

FIG. 5 is a diagram showing an example signaling sequence 500 for handing off provision of location services according to one embodiment. It will be understood that the example sequence shown is a simplified sequence, and modifications, additions, or omissions may be made without departing from the scope of the present disclosure. As shown in FIG. 5, a manager device 502 (a smartphone in this example) may act as a manager of a cluster established between the devices 502, 504, 506. The client devices 504 and 506 are a wearable device and a car navigation system, respectively, in the example shown.

As shown in FIG. 5, before establishing a cluster between the devices 502, 504, 506, the manager device 502 has its GNSS capabilities enabled and is providing a location service session (e.g., a navigation session) at 510, while the client devices 504, 506 have their GNSS capabilities disabled at 511, 512, respectively (e.g., because they do not have an active navigation or location services session). The manager device 502 may accordingly have fresh position information (e.g., A-GNSS data). When the manager device 502 recognizes the client devices 504, 506 (e.g., comes into radio range of the devices), it may establish a wireless connection and a location profile communication cluster with the client devices at 513. The wireless connection and cluster may be established according to the example sequence 300 of FIG. 3. The manager device 502 may then query the client devices for information (e.g., as shown in the sequence 400 of FIG. 4), or may already have information about the client devices 504, 506 from a previous cluster session.

After establishing the cluster at 513, the manager device 502 may determine a provision of location services for the cluster at 514. As shown in FIG. 5, the manager device 502 may determine to hand off its current location service session to the client device 506 (car navigation system). The manager device 502 may make this determination in response to a command from a user (e.g., received in response to a prompt provided to the user upon establishing the cluster), based on an assumption that a car navigation system should handle navigation when connected to any cluster, or based on other information or reasoning. The manager device 502 may accordingly send an NMEA proprietary command to the client device 506 at 515 to enable the GNSS capabilities of the client device 506. After the GNSS capabilities of the client device 506 are enabled at 516, the manager device 502 may send additional NMEA sentences to the client device 506 at 517, 518, 519, 520 to hand off the current location service session. For example, the manager device 502 may send its current A-GNSS data at 517, current position information at 518, recommended minimum GNSS data at 519, and a command to the client device 506 at 520 to receive the hand off of service provision from the manager device 502. After receiving the NMEA sentences, the client device 506 may take over provision of the location service duties at 521, and the GNSS capabilities of the manager device 502 may be disabled at 522 (e.g., to reduce redundancy, save battery or other resources of the mobile phone, or for another reason).

In some embodiments, the client devices 504, 506 may share location report backlog information for continuous geo-logging by the manager device 502. In addition, in some embodiments, the devices may support cluster continuous geo-fencing by sharing geographical fences and associated rules of reporting. In some embodiments, a client device with an active location service session may perform a handshake process with a current manager device to become the new cluster manager, which may allow for further power and resource savings.

Figure 6:
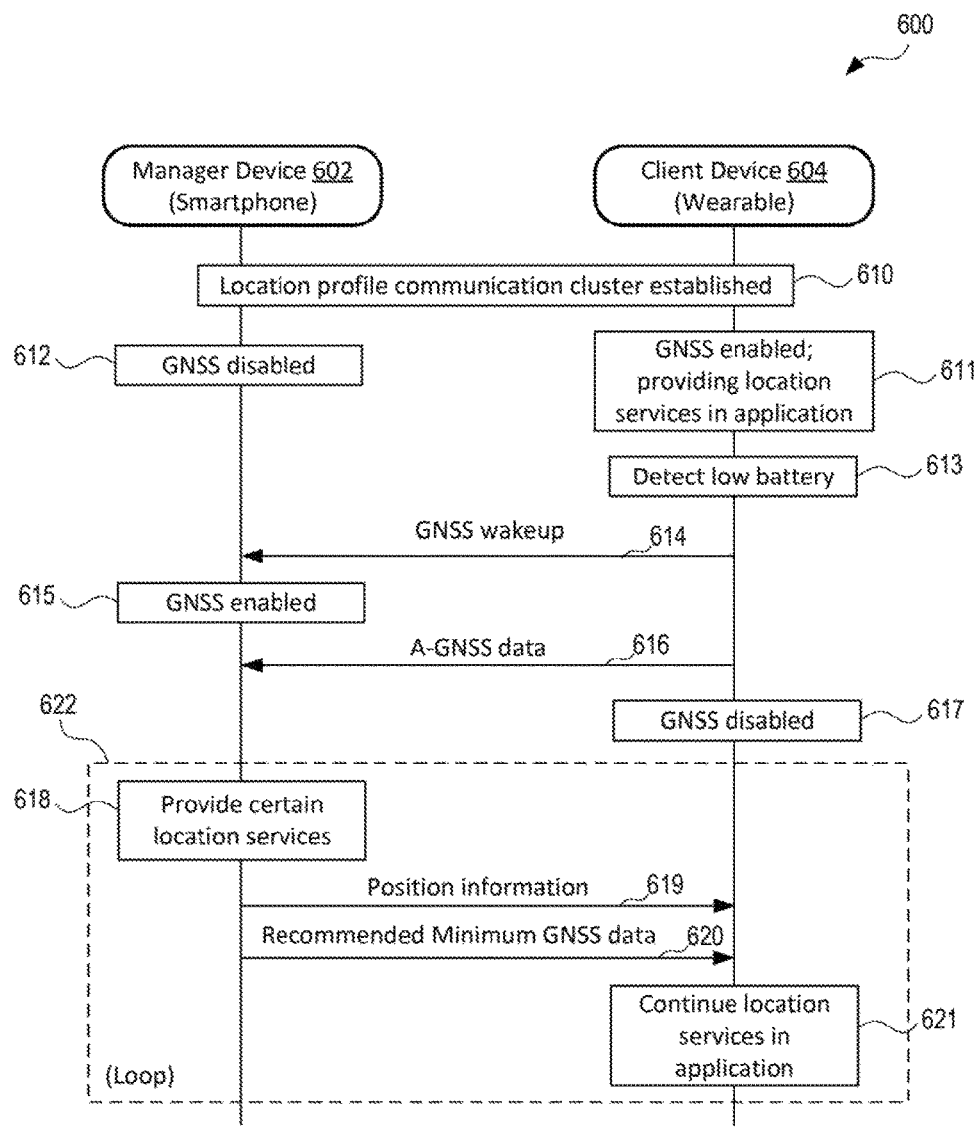
FIG. 6 is a diagram showing an example signaling sequence for sharing location service duties according to one embodiment.

FIG. 6 is a diagram showing an example signaling sequence 600 for sharing location service duties according to one embodiment. It will be understood that the example sequence shown is a simplified sequence, and modifications, additions, or omissions may be made without departing from the scope of the present disclosure. As shown in FIG. 6, a manager device 602 (a smartphone in this example) may act as a manager of a cluster with the client device 604 (a wearable device, such as a smart watch, in this example). The client device 604 may provide a location service session to a user at 611 (e.g., via an application using the device's GNSS capabilities). The manager device 602 may have its GNSS capabilities disabled at 613 while the client device 604 is providing the location service session. At some point while providing the location service session, the client device 604 may detect a low battery level at 613. In response, the client device 604 may send a GNSS wakeup message (e.g., an NMEA proprietary command) to the manager device 602 at 614 to enable the GNSS capabilities of the manager device 602. After the GNSS capabilities of the manager device 602 are enabled at 615, the client device 604 sends its A-GNSS data to the manager device 602 (e.g., via one or more NMEA proprietary sentences) at 616 and disables its GNSS capabilities at 617 (e.g., to conserve battery resources, reduce GNSS redundancy, or both).

After receiving the A-GNSS data sent at 616, the manager device 602 may provide certain GNSS responsibilities at 618 that the client device 604 was handling at 611. The manager device 602 may then provide determined position information and recommended minimum GNSS data to the client device 604 at 619, 620, respectively, and the client device 604 may continue to provide the location service session at 621 using the information received from the manager device 602 at 619, 620. The devices 602, 604 may continue 618, 619, 620, and 621 in the loop 622 as needed. That is, the manager device 602 may continue to provide position reports to the client device 604 as needed, such as until the location services are no longer needed or a battery level is appropriate on the client device 604.

Figure 7:
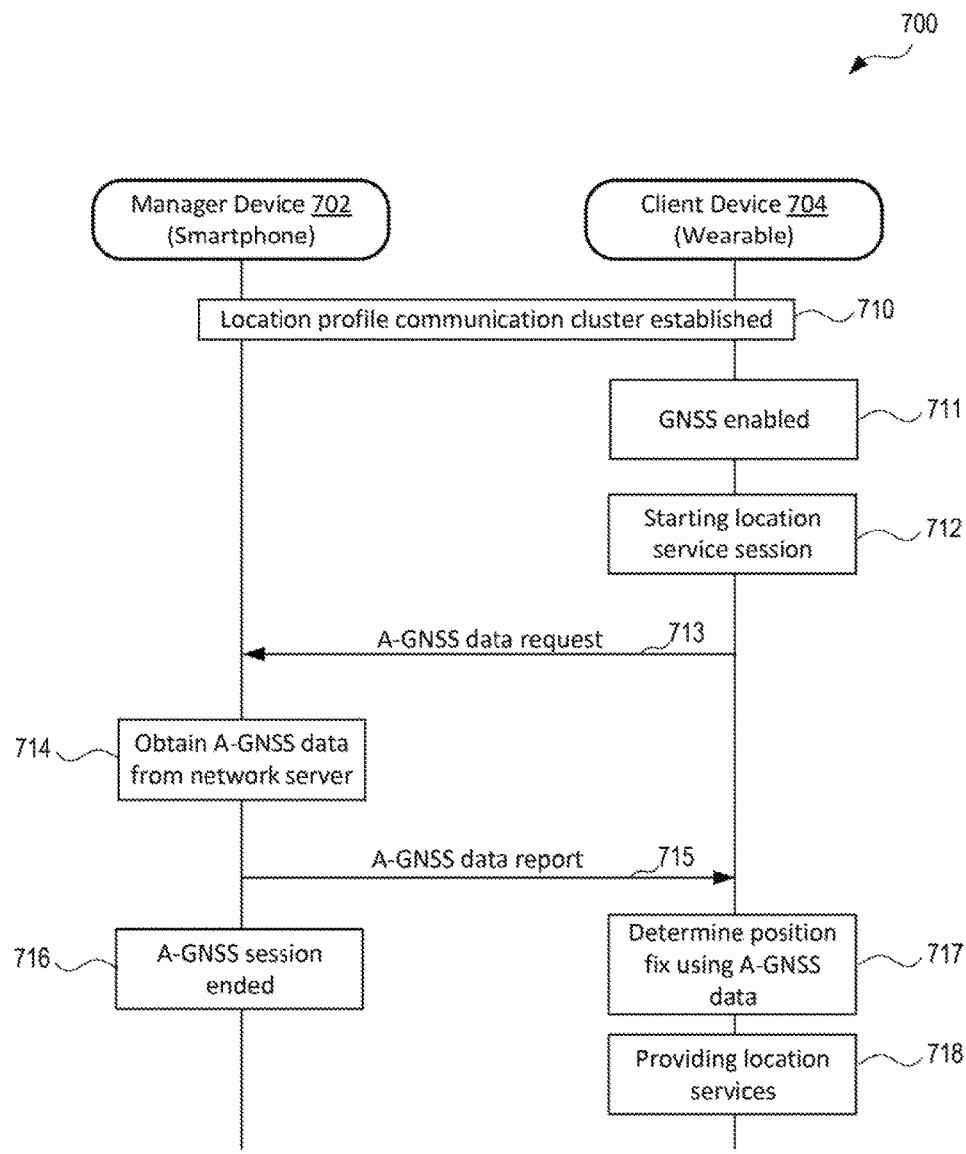
FIG. 7 is a diagram showing another example signaling sequence for sharing location service duties according to one embodiment.

FIG. 7 is a diagram showing another example signaling sequence 700 for sharing location service duties according to one embodiment. It will be understood that the example sequence shown is a simplified sequence, and modifications, additions, or omissions may be made without departing from the scope of the present disclosure. As shown in FIG. 7, a manager device 702 (a smartphone in this example) may act as a manager of the cluster with the client device 704 (a wearable device, such as a smart watch, in this example). The devices 702, 704 may first establish a location profile communication cluster at 710. The client device 704 may have its GNSS capabilities enabled at 711 and may start a location services session at 712. Because the client device 704 may not be A-GNSS capable, a certain amount of time may be required to obtain a first position fix using its GNSS capabilities (a current position based on GNSS data received). However, the manager device 702 in the example shown is A-GNSS capable.

Accordingly, to start the provision location services, the client device 704 may send a request for A-GNSS data at 713 to the manager device 702 (e.g., via an NMEA query). The manager device 702 may utilize its A-GNSS capabilities to obtain A-GNSS data from a network server at 714 (e.g., over its cellular network connection), and may send an A-GNSS data report to the client device 704 at 715. The manager device 702 may then end its A-GNSS session at 716. The client device 704 uses the A-GNSS data from the manager device 702 to determine its position fix at 717, and may then provide the location services at 718 going forward using its own GNSS capabilities.

In some embodiments, the client device 704 may have knowledge of A-GNSS capabilities for other cluster devices (e.g., the manager device 702 in this example), and may, when a first position fix is needed, request A-GNSS data from such devices rather than attempting to compute or otherwise determine a first position fix itself. In some instances, the client device 704 may send the request for A-GNSS data after a certain amount of time has elapsed while trying to determine a current position using its own GNSS capabilities.

Figure 8:
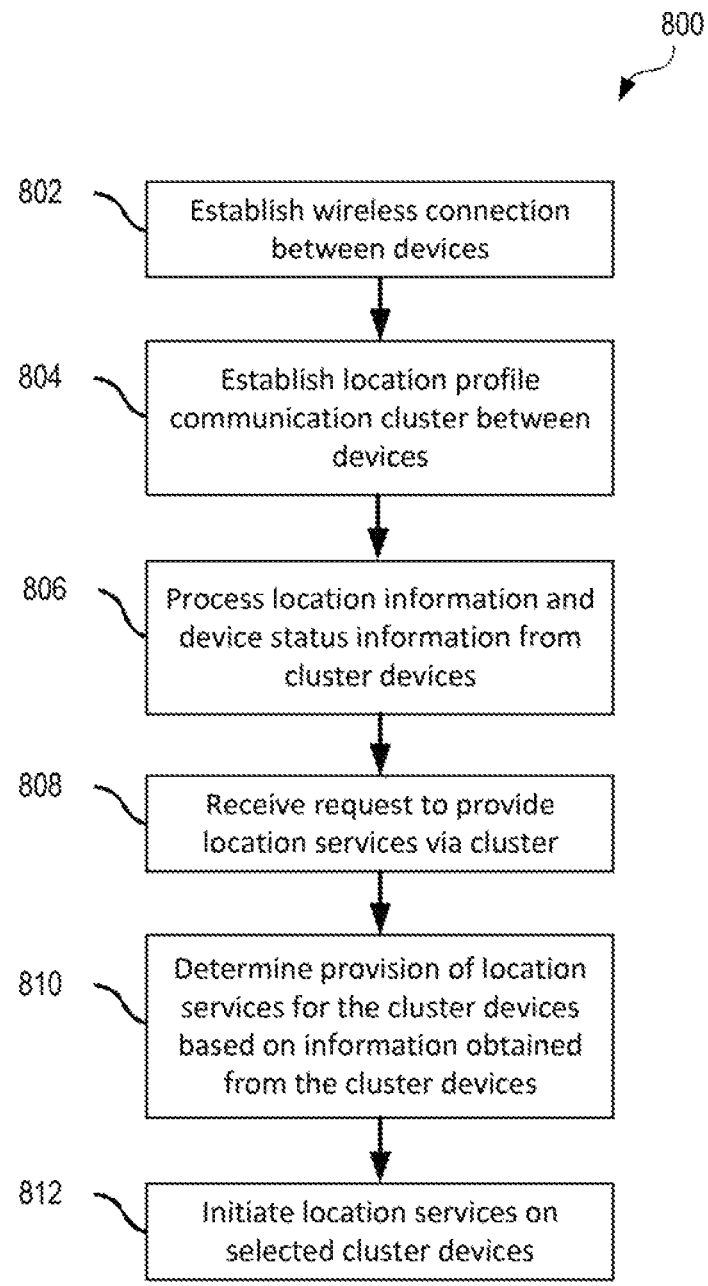
FIG. 8 is a flow diagram showing an example process for determining provision of location services for a cluster according to one embodiment.

FIG. 8 is a flow diagram showing an example process 800 for determining provision of location services for a cluster according to one embodiment. Operations in the example process 800 may be performed by components of a manager device of a location profile communication cluster (e.g., by processing circuitry of the manager device 210 in the example shown in FIG. 2), by another device, or a set of devices. The example process 800 may include additional or different operations, and the operations may be performed in the order shown or in another order. In some cases, one or more of the operations shown in FIG. 8 are implemented as processes that include multiple operations, sub-processes, or other types of routines. In some cases, operations can be combined, performed in another order, performed in parallel, iterated, or otherwise repeated or performed another manner.

At 802, a wireless connection is established between devices. The wireless connection may be a personal area network (PAN) connection. In some embodiments, the devices may establish wireless connections with one another according to a Bluetooth protocol, or another standardized protocol. In some instances, the devices may automatically connect to one another when in close proximity (e.g., when in radio range of one another). For example, the devices may support a Proximity profile of the Bluetooth protocol.

At 804, a location profile communication cluster is established between the devices. The cluster may be established by a manager device that receives cluster connection requests from other (client) devices. In some embodiments, the cluster connection requests are formatted according to a profile of the wireless communication protocol used to establish the wireless connection between the devices at 802. For example, in some instances, the connection requests are formatted according to a version of GNSS Profile of the Bluetooth protocol (e.g., an Enhanced Bluetooth GNSS Profile).

At 806, location information and device status information from cluster devices is processed. The information may be processed by a manager device of the cluster. For example, in some embodiments, a manager device may send queries (e.g., formatted according to an NMEA protocol), and receive the information from the other devices in response (e.g., by messages (sentences) formatted according to the NMEA protocol). The information processed may include device status information (e.g., if they are GNSS capable, if they have outdoor/indoor positioning capabilities, and the accuracy they are capable to, their battery status (e.g. external power source/charging/battery above thresholds, e.g. 20%/battery below thresholds, e.g. 20%)), ongoing location services status information for the devices (e.g. whether the devices have ongoing fitness sessions, driving sessions, pedestrian sessions, etc., and for which application the services are being provided), a GNSS data state (e.g., if the device has a fresh fix and the accuracy of it, or if it has any fresh assistance data (e.g., reference position, reference time, ephemeris, SV health, Ionospheric corrections, etc.)), or another type of information that might be used in determining the provision of location services in the cluster.

At 808, a request to provide location services via the cluster is received. The request may be received at any device of the cluster. For example, the request may be received at the manager device or a client device of the cluster. The request may be to provide certain location services using an application of the device. For example, a user may request navigation services on a smartphone or fitness location tracking on a smart watch.

At 810, provisioning of location services for the cluster devices is determined based on information received from the cluster devices at 806. The provisioning may be determined by a designated manager device of the cluster, or by another device or set of devices. The provisioning may be based on device capabilities, input from a user of the devices, or a combination thereof. For instance, the device being interacted with by the user may prompt the user to select a device to provide location services based on a preliminary determination of an optimal provisioning. As one example, suppose a user has a current navigation session going on a smartphone when the smartphone (as cluster manager) detects a car navigation system added to the cluster. The smartphone may determine that the car navigation system might be the optimal device to continue with the location services, and may prompt the user to select between the smartphone and the car navigation system. In some cases, the location services may be provisioned between multiple devices of the cluster. For example, A-GNSS data may be obtained using a first device with A-GNSS capabilities and provided to as second device for use in determining a first position fix and thereafter providing location services. As another example, one device may obtain GNSS data and provide the GNSS data to an application of another device in the cluster to provide location services. At 812, location services are initiated on cluster devices selected at 810.

Embodiments of the present disclosure may, in some instances, provide one or more advantages. In some instances, for example, devices of a location profile communication cluster may provide a continuous location service experience between devices, improving overall performance and reducing power consumption by the devices of the cluster. The continuous location service experience may avoid manual solutions and their associated inefficiencies, such as manually switching off a session on one device and starting a new session on a new device. As another example, in some instances, devices of a cluster may share duties or aspects of the provision of location services to a user based on their capabilities, resources, or a combination thereof. For instance, an ongoing navigation session may be handed over from a cluster device to a more appropriate cluster device (e.g., a car navigation system while driving), or certain aspects of a navigation session (e.g., determining a current location) may be provided by a device other than the one presenting the navigation information to a user, conserving resources of the devices or more efficiently utilizing the devices according to their capabilities.

Functions, operations, components and/or features described herein with reference to one or more embodiments, may be combined with, or may be utilized in combination with, one or more other functions, operations, components and/or features described herein with reference to one or more other embodiments, or vice versa.

EXAMPLES

The following examples pertain to further embodiments. It will be understood that certain examples listed below may be combined with other examples, or certain aspects of other examples.

Example 1 includes an apparatus of a first wireless communication device, the apparatus comprising: a memory; and processing circuitry coupled to the memory to: establish a wireless connection between the first wireless communication device and a second wireless communication device according to a wireless connectivity protocol; establish, using the wireless connectivity protocol, a location profile communication cluster including the first device and the second device; and within the communication cluster: process a message from the second device including location information; and determine a provision of location services for the cluster based on the location information.

Example 2 includes the subject matter of Example 1, and optionally, wherein the processing circuitry is to determine the provision of location services by one of: providing location services for the cluster; or handing off to the second device the provision of location services for the cluster and disabling location services of the first device.

Example 3 includes the subject matter of Example 2, and optionally, wherein handing off provision of the location services for the cluster includes causing transmission, within the cluster, of a wakeup message to the second communication device to enable location services of the second device.

Example 4 includes the subject matter of Example 2, and optionally, wherein the processing circuitry is to provide location services for the cluster by: processing a wakeup message from the second device to enable location services; and causing transmission to the second device of position reports in response to processing the wakeup message to enable location services.

Example 5 includes the subject matter of Example 1, and optionally, wherein the second device includes a plurality of second devices.

Example 6 includes the subject matter of Example 1, and optionally, wherein the processing circuitry is to establish the cluster by: processing a request from the second device to connect to the cluster; and causing transmission to the second device of a connection accept message in response to the request to connect to the cluster.

Example 7 includes the subject matter of Example 1, and optionally, wherein the processing circuitry is further to, within the cluster: cause transmission to the second device of a request for the location information; and process the message including the location information in response to the request for the location information.

Example 8 includes the subject matter of Example 1, and optionally, wherein the processing circuitry is further to, within the cluster: cause transmission to the second device of at least one of a request for status information and a request for positioning session information; process at least one of a message including the status information from the second device and a message including the positioning session information from the second device in response to corresponding ones of the request for status information and the request for positioning session information; and determine the provision of the location services based on at least one of the status information and the positioning session information.

Example 9 includes the subject matter of Example 1, and optionally, wherein the processing circuitry is further to, within the cluster: process a request from the second device for a current position report; and cause transmission to the second device of a current position report.

Example 10 includes the subject matter of Example 9, and optionally, wherein the processing circuitry is further to: cause transmission of a request for assisted Global Navigation Satellite System (A-GNSS) data in response to processing the request from the second device for a position report; and cause transmission to the second device of the A-GNSS data.

Example 11 includes the subject matter of Example 1, and optionally, wherein the message is compliant with a National Marine Electronics Association (NMEA) protocol.

Example 12 includes the subject matter of Example 1, and optionally, further including a location services component coupled to the processing circuitry, the location services components including circuitry configured to provide location services according to a Global Navigation Satellite System (GNSS).

Example 13 includes the subject matter of Example 1, and optionally, wherein the wireless connectivity protocol includes a Bluetooth protocol.

Example 14 includes the subject matter of Example 13, and optionally, further including a Bluetooth component coupled to the processing circuitry, and one or more antennas coupled to the Bluetooth component.

Example 15 includes a product comprising one or more tangible computer-readable non-transitory storage media comprising computer-executable instructions operable to, when executed by at least one computer processor, enable the at least one computer processor to implement operations comprising: establishing a wireless connection between the first wireless communication device and a second wireless communication device according to a wireless connectivity protocol; establishing, using the wireless connectivity protocol, a location profile communication cluster including the first device and the second device; processing a message from the second device including location information; and determining a provision of location services for the cluster based on the location information.

Example 16 includes the subject matter of Example 15, and optionally, wherein the operations include determining the provision of location services by one of: providing location services for the cluster; or handing off to the second device the provision of location services for the cluster and disabling location services of the first device.

Example 17 includes the subject matter of Example 16, and optionally, wherein handing off provision of the location services for the cluster includes causing transmission, within the cluster, of a wakeup message to the second communication device to enable location services of the second device.

Example 18 includes the subject matter of Example 16, and optionally, wherein the operations include providing location services for the cluster by: processing a wakeup message from the second device to enable location services;

and causing transmission to the second device of position reports in response to processing the request to enable location services.

Example 19 includes the subject matter of Example 15, and optionally, wherein the second device includes a plurality of second devices.

Example 20 includes the subject matter of Example 15, and optionally, wherein the operations include establishing the cluster by: processing a request from the second device to connect to the cluster; and causing transmission to the second device of a connection accept message in response to the request to connect to the cluster.

Example 21 includes the subject matter of Example 15, and optionally, wherein the operations further include: causing transmission to the second device of a request for the location information; and processing the message including the location information in response to the request for the location information.

Example 22 includes the subject matter of Example 15, and optionally, wherein the operations further include: causing transmission to the second device of at least one of a request for status information and a request for positioning session information; processing at least one of a message including the status information from the second device and a message including the positioning session information from the second device in response to corresponding ones of the request for status information and the request for positioning session information; and determining the provision of the location services based on at least one of the status information and the positioning session information.

Example 23 includes the subject matter of Example 15, and optionally, wherein the operations further include: processing a request from the second device for a current position report; and causing transmission to the second device of a current position report.

Example 24 includes the subject matter of Example 23, and optionally, wherein the operations further include: causing transmission of a request for assisted Global Navigation Satellite System (A-GNSS) data in response to processing the request from the second device for a position report; and causing transmission to the second device of the A-GNSS data.

Example 25 includes a method, comprising: establishing a wireless connection between the first wireless communication device and a second wireless communication device according to a wireless connectivity protocol; establishing, using the wireless connectivity protocol, a location profile communication cluster including the first device and the second device; processing a message from the second device including location information; and determining a provision of location services for the cluster based on the location information.

Example 26 includes the subject matter of Example 25, and optionally, wherein determining the provision of location services comprises one of: providing location services for the cluster; or handing off to the second device the provision of location services for the cluster and disabling location services of the first device.

Example 27 includes the subject matter of Example 26, and optionally, wherein handing off provision of the location services for the cluster includes causing transmission, within the cluster, of a wakeup message to the second communication device to enable location services of the second device.

Example 28 includes the subject matter of Example 26, and optionally, further comprising: processing a wakeup message from the second device to enable location services; and causing transmission to the second device of position reports in response to processing the request to enable location services.

Example 29 includes the subject matter of Example 25, and optionally, further comprising: processing a request from the second device for a current position report; and causing transmission to the second device of a current position report.

Example 30 includes the subject matter of Example 29, and optionally, further comprising: causing transmission of a request for assisted Global Navigation Satellite System (A-GNSS) data in response to processing the request from the second device for a position report; and causing transmission to the second device of the A-GNSS data.

Example 31 includes an apparatus of a first wireless communication device, the apparatus comprising: a memory; and processing circuitry coupled to the memory to: establish a wireless connection between the first wireless communication device and a second wireless communication device according to a wireless connectivity protocol; establish, using the wireless connectivity protocol, a location profile communication cluster including the first device and the second device; and within the communication cluster: cause transmission to the second device of a message including location information; and provide location services for the cluster in response to causing transmission of the message.

Example 32 includes the subject matter of Example 31, and optionally, wherein the processing circuitry is further to, within the cluster: process a wakeup message from the second device to enable location services; enable location services on the first device in response to processing the request for location services; and provide location services for the cluster in response to processing a handoff, from the second device, of a current provision of location services for the cluster.

Example 33 includes the subject matter of Example 31, and optionally, wherein the processing circuitry is further to, within the cluster: cause transmission of a wakeup message to the second device to enable location services on the second device; disable location services on the first device in response to transmission of the request to enable location services on the second device; and provide location services for the cluster based on repeated position reports from the second device in response to the request to enable location services on the second device.

Example 34 includes the subject matter of Example 33, and optionally, wherein the processing circuitry is to cause transmission of the wakeup message in response to detecting that a resource level of the first device is below a threshold value.

Example 35 includes the subject matter of Example 31, and optionally, wherein the processing circuitry is further to, within the cluster: cause transmission of a request to the second device for a current position report; and provide location services for the cluster based on a position report from the second device in response to the request for the position report.

Example 36 includes the subject matter of Example 35, and optionally, wherein the processing circuitry is to cause transmission of the request for a current position report in response to detecting that the second device is assisted Global Navigation Satellite System (A-GNSS) capable.

Example 37 includes the subject matter of Example 31, and optionally, wherein the processing circuitry is further to, within the cluster: cause transmission to the second device of a request to connect to the cluster; and process a connection accept message from the second device in response to the request to connect to the cluster.

Example 38 includes the subject matter of Example 31, and optionally, wherein the processing circuitry is further to, within the cluster: process a request from the second device for at least one of status information and positioning session information; and cause transmission to the second device of at least one of a message including the status information and a message including the positioning session information in response to processing corresponding ones of the request for status information and the request for positioning session information.

Example 39 includes the subject matter of Example 31, and optionally, wherein the message is compliant with a National Marine Electronics Association (NMEA) protocol.

Example 40 includes the subject matter of Example 31, and optionally, further including a location services component coupled to the processing circuitry, the location services component including circuitry configured to provide location services according to a Global Navigation Satellite System (GNSS).

Example 41 includes the subject matter of Example 31, and optionally, wherein the wireless communication protocol includes a Bluetooth protocol.

Example 42 includes the subject matter of Example 41, and optionally, further including a Bluetooth component coupled to the processing circuitry, and one or more antennas coupled to the Bluetooth component.

Example 43 includes a product comprising one or more tangible computer-readable non-transitory storage media comprising computer-executable instructions operable to, when executed by at least one computer processor, enable the at least one computer processor to implement operations comprising: establishing a wireless connection between the first wireless communication device and a second wireless communication device according to a wireless connectivity protocol; establishing, using the wireless connectivity protocol, a location profile communication cluster including the first device and the second device; and causing transmission to the second device of a message including location information; and providing location services for the cluster in response to causing transmission of the message.

Example 44 includes the subject matter of Example 43, and optionally, wherein the operations further include: processing a wakeup message from the second device to enable location services; and enabling location services on the first device in response to processing the request for location services; and providing location services for the cluster in response to processing a handoff, from the second device, of a current provision of location services for the cluster.

Example 45 includes the subject matter of Example 43, and optionally, wherein the operations further include: causing transmission of a wakeup message to the second device to enable location services on the second device; disabling location services on the first device in response to transmission of the request to enable location services on the second device; and providing location services for the cluster based on repeated position reports from the second device in response to the request to enable location services on the second device.

Example 46 includes the subject matter of Example 45, and optionally, wherein the operations further include causing transmission of the wakeup message in response to detecting that a resource level of the first device is below a threshold value.

Example 47 includes the subject matter of Example 43, and optionally, wherein the operations further include: causing transmission of a request to the second device for a current position report; and providing location services for the cluster based on a position report from the second device in response to the request for the position report.

Example 48 includes the subject matter of Example 47, and optionally, wherein the operations further include causing transmission of the request for a current position report in response to detecting that the second device is assisted Global Navigation Satellite System (A-GNSS) capable.

Example 49 includes the subject matter of Example 43, and optionally, wherein the operations further include causing transmission to the second device of a request to connect to the cluster; and processing a connection accept message from the second device in response to the request to connect to the cluster.

Example 50 includes the subject matter of Example 43, and optionally, wherein the operations further include: processing a request from the second device for at least one of status information and positioning session information; and causing transmission to the second device of at least one of a message including the status information and a message including the positioning session information in response to processing corresponding ones of the request for status information and the request for positioning session information.

Example 51 includes an apparatus comprising: means for establishing a wireless connection between the first wireless communication device and a second wireless communication device according to a wireless connectivity protocol; means for establishing, using the wireless connectivity protocol, a location profile communication cluster including the first device and the second device; and means for causing transmission to the second device of a message including location information; and means for providing location services for the cluster in response to causing transmission of the message.

Example 52 includes the subject matter of Example 51, and optionally, further comprising: means for processing a wakeup message from the second device to enable location services; means for enabling location services on the first device in response to processing the request for location services; and means for providing location services for the cluster in response to processing a handoff, from the second device, of a current provision of location services for the cluster.

Example 53 includes the subject matter of Example 51, and optionally, further comprising: means for causing transmission of a wakeup message to the second device to enable location services on the second device; means for disabling location services on the first device in response to transmission of the request to enable location services on the second device; and means for providing location services for the cluster based on repeated position reports from the second device in response to the request to enable location services on the second device.

Example 54 includes the subject matter of Example 51, and optionally, further comprising: means for causing transmission of a request to the second device for a current position report; and means for providing location services for the cluster based on a position report from the second device in response to the request for the position report.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus of a first wireless communication device, the apparatus comprising:
    memory; and
    processing circuitry coupled to the memory to:
        establish a wireless connection between the first wireless communication device and a second wireless communication device according to a wireless connectivity protocol;
        establish, using the wireless connectivity protocol, a location profile communication cluster including the first device and the second device; and
        within the communication cluster:
            process a message from the second device including location information; and
            determine a provision of location services for the cluster based on the location information, wherein determining the provision of location services comprises determining whether the location services are to be provided by the first device, the second device, or a combination thereof.

2. The apparatus of claim 1, wherein the processing circuitry is to determine the provision of location services by one of:
    providing location services for the cluster; or
    handing off to the second device the provision of location services for the cluster and disabling location services of the first device.

3. The apparatus of claim 2, wherein handing off provision of the location services for the cluster includes causing transmission, within the cluster, of a wakeup message to the second communication device to enable location services of the second device.

4. The apparatus of claim 2, wherein the processing circuitry is to provide location services for the cluster by:
    processing a wakeup message from the second device to enable location services; and
    causing transmission to the second device of position reports in response to processing the wakeup message to enable location services.

5. The apparatus of claim 1, wherein the processing circuitry is to establish the cluster by:
    processing a request from the second device to connect to the cluster; and
    causing transmission to the second device of a connection accept message in response to the request to connect to the cluster.

6. The apparatus of claim 1, wherein the processing circuitry is further to, within the cluster:
    cause transmission to the second device of a request for the location information; and
    process the message including the location information in response to the request for the location information.

7. The apparatus of claim 1, wherein the processing circuitry is further to, within the cluster:
    cause transmission to the second device of at least one of a request for status information and a request for positioning session information;
    process at least one of a message including the status information from the second device and a message including the positioning session information from the second device in response to corresponding ones of the request for status information and the request for positioning session information; and
    determine the provision of the location services based on at least one of the status information and the positioning session information.

8. The apparatus of claim 1, wherein the processing circuitry is further to, within the cluster:
    process a request from the second device for a current position report; and
    cause transmission to the second device of a current position report.

9. The apparatus of claim 8, wherein the processing circuitry is further to:
    cause transmission of a request for assisted Global Navigation Satellite System (A-GNSS) data in response to processing the request from the second device for a position report; and
    cause transmission to the second device of the A-GNSS data.

10. The apparatus of claim 1, further comprising:
    a location services component coupled to the processing circuitry, the location services component including circuitry to provide location services according to a Global Navigation Satellite System (GNSS); and
    a Bluetooth component coupled to the processing circuitry, the Bluetooth component including circuitry to establish the wireless connection between the first wireless communication device and the second wireless communication.

11. A product comprising one or more tangible computer-readable non-transitory storage media comprising computer-executable instructions operable to, when executed by at least one computer processor, enable the at least one computer processor to implement operations comprising:
    establishing a wireless connection between a first wireless communication device and a second wireless communication device according to a wireless connectivity protocol;
    establishing, using the wireless connectivity protocol, a location profile communication cluster including the first device and the second device;
    processing a message from the second device including location information; and
    determining a provision of location services for the cluster based on the location information, wherein determining the provision of location services comprises determining whether the location services are to be provided by the first device, the second device, or a combination thereof.

12. The product of claim 11, wherein the operations further include determining the provision of location services by one of:
    providing location services for the cluster; or
    handing off to the second device the provision of location services for the cluster and disabling location services of the first device.

13. The product of claim 11, wherein the operations further include:
    causing transmission to the second device of at least one of a request for status information and a request for positioning session information;
    processing at least one of a message including the status information from the second device and a message including the positioning session information from the second device in response to corresponding ones of the request for status information and the request for positioning session information; and
    determining the provision of the location services based on at least one of the status information and the positioning session information.

14. An apparatus of a first wireless communication device, the apparatus comprising:

memory; and processing circuitry coupled to the memory to:

establish a wireless connection between the first wireless communication device and a second wireless communication device according to a wireless connectivity protocol;

establish, using the wireless connectivity protocol, a location profile communication cluster including the first device and the second device; and within the communication cluster:

cause transmission to the second device of a message including location information;

receive an indication from the first device that the second device is to provide certain location services for the cluster in response to causing transmission of the message; and provide the location services for the cluster based on the indication.

15. The apparatus of claim 14, wherein the processing circuitry is further to, within the cluster:

process a wakeup message from the second device to enable location services; and enable location services on the first device in response to processing the request for location services; and provide location services for the cluster in response to processing a handoff, from the second device, of a current provision of location services for the cluster.

16. The apparatus of claim 14, wherein the processing circuitry is further to, within the cluster:

cause transmission of a wakeup message to the second device to enable location services on the second device;

disable location services on the first device in response to transmission of the request to enable location services on the second device; and provide location services for the cluster based on repeated position reports from the second device in response to the request to enable location services on the second device.

17. The apparatus of claim 16, wherein the processing circuitry is to cause transmission of the wakeup message in response to detecting that a resource level of the first device is below a threshold value.

18. The apparatus of claim 14, wherein the processing circuitry is further to, within the cluster:

cause transmission of a request to the second device for a current position report; and provide location services for the cluster based on a position report from the second device in response to the request for the position report.

19. The apparatus of claim 18, wherein the processing circuitry is to cause transmission of the request for a current position report in response to detecting the second device is assisted Global Navigation Satellite System (A-GNSS) capable.

20. The apparatus of claim 14, wherein the processing circuitry is further to, within the cluster:

cause transmission to the second device of a request to connect to the cluster; and process a connection accept message from the second device in response to the request to connect to the cluster.

21. The apparatus of claim 14, wherein the processing circuitry is further to, within the cluster:

process a request from the second device for at least one of status information and positioning session information; and cause transmission to the second device of at least one of a message including the status information and a message including the positioning session information in response to processing corresponding ones of the request for status information and the request for positioning session information.

22. An apparatus comprising:

means for establishing a wireless connection between the first wireless communication device and a second wireless communication device according to a wireless connectivity protocol;

means for establishing, using the wireless connectivity protocol, a location profile communication cluster including the first device and the second device; and means for causing transmission to the second device of a message including location information;

means for receiving an indication from the first device that the second device is to provide certain location services for the cluster in response to causing transmission of the message; and means for providing the location services for the cluster based on the indication.

23. The apparatus of claim 22, further comprising:

means for processing a wakeup message from the second device to enable location services; and means for enabling location services on the first device in response to processing the request for location services; and means for providing location services for the cluster in response to processing a handoff, from the second device, of a current provision of location services for the cluster.

24. The apparatus of claim 22, further comprising:

means for causing transmission of a wakeup message to the second device to enable location services on the second device;

means for disabling location services on the first device in response to transmission of the request to enable location services on the second device; and means for providing location services for the cluster based on repeated position reports from the second device in response to the request to enable location services on the second device.

25. The apparatus of claim 22, further comprising:

means for causing transmission of a request to the second device for a current position report; and means for providing location services for the cluster based on a position report from the second device in response to the request for the position report.

* * * * *